(12) United States Patent
Yeh

(10) Patent No.: US 10,649,743 B2
(45) Date of Patent: May 12, 2020

(54) APPLICATION DEVELOPING METHOD AND SYSTEM

(71) Applicant: Chen-Chung Yeh, Taipei (TW)

(72) Inventor: Chen-Chung Yeh, Taipei (TW)

( * ) Notice: Subject to any disclaimer, the term of this patent is extended or adjusted under 35 U.S.C. 154(b) by 309 days.

(21) Appl. No.: 15/398,334

(22) Filed: Jan. 4, 2017

(65) Prior Publication Data

US 2017/0199729 A1 Jul. 13, 2017

(30) Foreign Application Priority Data

Jan. 7, 2016 (TW) ............................... 105100426 A

(51) Int. Cl.
*G06F 9/44* (2018.01)
*G06F 8/35* (2018.01)
*G06F 8/20* (2018.01)
*G06F 8/36* (2018.01)

(52) U.S. Cl.
CPC .................. *G06F 8/35* (2013.01); *G06F 8/20* (2013.01); *G06F 8/36* (2013.01)

(58) Field of Classification Search
CPC ........................................................ G06F 8/35
USPC ........................................................ 717/104
See application file for complete search history.

(56) References Cited

U.S. PATENT DOCUMENTS

| 2006/0129985 | A1 | 6/2006 | Tamura | |
|---|---|---|---|---|
| 2010/0125832 | A1* | 5/2010 | Prasad | G06F 11/3604 717/124 |
| 2010/0281475 | A1 | 11/2010 | Jain et al. | |
| 2011/0107227 | A1* | 5/2011 | Rempell | H04L 51/046 715/738 |
| 2012/0254842 | A1* | 10/2012 | Henderson | G06F 8/24 717/136 |
| 2013/0042219 | A1* | 2/2013 | Said | G06F 8/436 717/103 |
| 2014/0236843 | A1* | 8/2014 | Bain | G06Q 10/103 705/301 |
| 2014/0245067 | A1* | 8/2014 | Agarwal | G06F 11/3692 714/38.1 |
| 2014/0297713 | A1* | 10/2014 | Meigen | G06F 8/20 709/203 |
| 2014/0371882 | A1* | 12/2014 | Nikhra | G05B 19/0423 700/89 |
| 2015/0088968 | A1* | 3/2015 | Wei | H04L 67/10 709/203 |
| 2016/0042013 | A1* | 2/2016 | Fan | G06F 17/30592 707/792 |
| 2016/0092339 | A1* | 3/2016 | Straub | G06F 9/44521 717/124 |
| 2016/0162312 | A1* | 6/2016 | Doherty | G06F 11/30 718/1 |

(Continued)

FOREIGN PATENT DOCUMENTS

CN 102375731 A 3/2012
TW 201500947 A 1/2015

*Primary Examiner* — Qamrun Nahar
(74) *Attorney, Agent, or Firm* — Muncy, Geissler, Olds & Lowe, P.C.

(57) ABSTRACT

The present disclosure relates to an electronic application developing method. The method comprises providing a development platform with a plurality of cross-industry application templates. Users can design applications and plan business processes via the development platform efficiently without building any infrastructure or writing any programming code.

19 Claims, 3 Drawing Sheets

(56) References Cited

U.S. PATENT DOCUMENTS

2016/0239275 A1* 8/2016 Singh ................... G06F 8/41
2017/0085639 A1* 3/2017 Marti ................... H04W 4/70
2017/0091270 A1* 3/2017 Guo ................. G06K 9/00456

* cited by examiner

APPLICATION DEVELOPING METHOD AND SYSTEM

BACKGROUND

1. Technical Field

The present disclosure relates generally to an electronic application developing method and system. More specifically, the present disclosure relates to an electronic application development method and system that provides an environment where no further development of application infrastructures or software coding is required.

2. Description of the Related Art

A development platform for applications can increase user's efficiency of building and tuning the development environment. Users can usually choose a development framework or version with development environment kits, and users can also monitor and control permissions for the developed application. In the development platform, a large number of function libraries are provided to increase the efficiency of application development.

A development platform for applications usually includes rapid environment building tools and a user-friendly interface and provides a variety of program libraries. Environment building tools can help users save time on building an environment; a user-friendly interface can reduce the technical barriers users may encounter in developing applications; and the variety of program libraries enable users to accelerate the development process.

Before using a development platform for applications to develop an application, users must receive a certain level of training on computer programming. Some of the reasons for this requirement are that users must have a certain degree of knowledge about the infrastructure of the applications they wish to develop and that users also need to write programming code in the development process. However, the use of such a development platform for applications will create a higher technical barrier for users.

SUMMARY

One aspect of the present disclosure relates to an electronic application developing method implemented on one or more computing devices. The method comprises: providing via one or more computing devices and electronic application development platform having an application template library comprising a plurality of application templates; and developing an electronic application through the development platform via the one or more computing devices, wherein no further development of application infrastructures or software coding is required.

Another aspect of the present disclosure relates to a non-transitory computer-readable storage medium. The non-transitory computer-readable storage medium is used to store instructions for performing a method for developing applications. The method for developing applications provides a development platform providing a plurality of application templates, wherein developing the application through the development platform does not include establishing any infrastructure or writing any programming code.

Another aspect of the present disclosure relates to an application developing system. The application developing system comprises a non-transitory computer-readable storage medium storing instructions for performing an application developing method and one or more processors configured to perform instructions stored on the non-transitory computer-readable storage medium.

BRIEF DESCRIPTION OF THE DRAWINGS

Common reference numerals are used throughout the drawings and the detailed description to indicate the same or similar elements. The present disclosure will be more apparent from the following detailed description taken in conjunction with the accompanying drawings.

DETAILED DESCRIPTION

Figure 1:
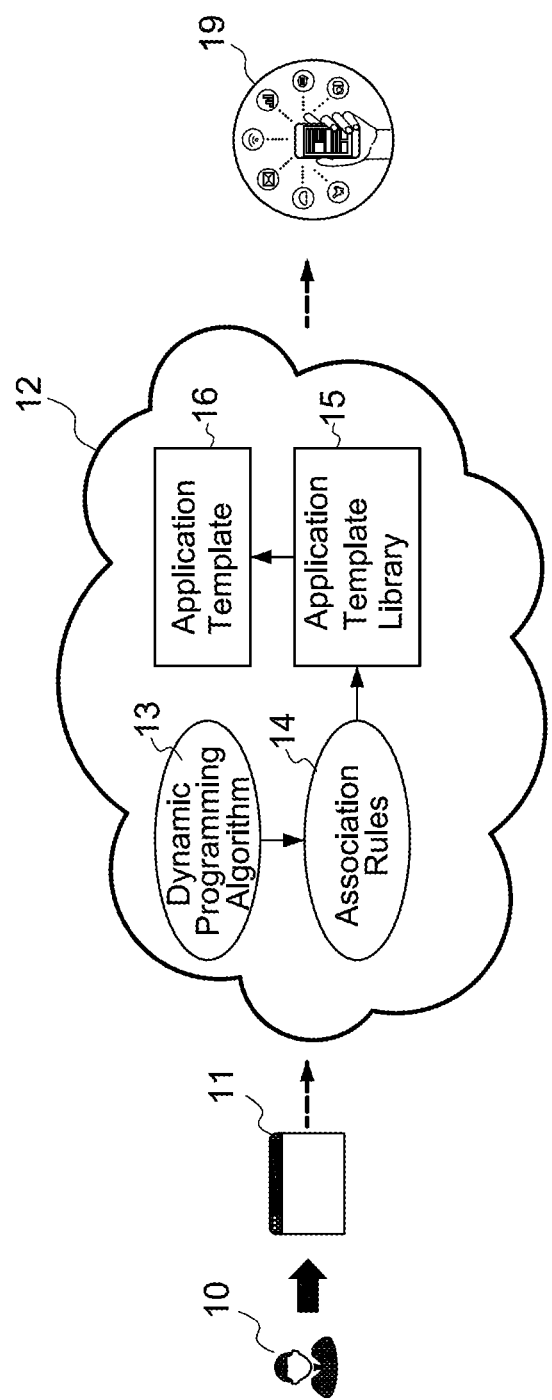
FIG. 1 illustrates an electronic application developing method and system in accordance with an embodiment of the present disclosure.

FIG. 1 illustrates an electronic application developing method and system in accordance with an embodiment of the present disclosure. As shown in FIG. 1, the present disclosure relates to a development platform 12 for electronic applications. The development platform 12 provides a cross-industry application template library 15. A user 10 can use the application templates to quickly design applications and plan business processes through a user visual interface 11 without development of any application infrastructures or software coding, and can deploy the developed electronic application 19 without publishing. As used herein, the singular terms "a," "an," and "the" may include plural referents unless the context clearly dictates otherwise.

In one of the embodiments of the present disclosure, the development platform for electronic applications uses cloud technology. The cloud technology allows computers and applications to be remotely operated and accessed via the Internet. Under the cloud technology, a virtual machine is executed in a large data center and replaces physical computers and servers. By putting the computation needs of many users into a single data center, the cloud technology can produce significant effects such as less power consumption, easier installation and maintenance, and more convenience for capacity and performance upgrades. Users can redeploy multiple applications from a local desktop computer or server to the cloud without publishing them. In another embodiment of the present disclosure, the development platform for applications can be implemented on a user's computer without using cloud technology. The hardware system for implementing the development platform for electronic applications can include the following components: one or more center processing units (CPUs)/processor(s), memories/storage units, input/output (I/O) device, networking units, etc.

In one embodiment of the present disclosure, the operation of a system for implementing the development platform includes the following steps: establishing a library of logic instructions for an application development platform; establishing other logic instructions for the development platform; storing the instructions in the memories/storage units accessible by the CPU(s)/processor(s); displaying the development platform including the library on the I/O device(s); receiving user requests from the I/O device(s); communicating the requests to the CPU(s)/processor(s); CPU(s)/processor(s) processes requests according to stored instructions; and CPU(s)/processor(s) communicates output to the I/O device(s).

As shown in FIG. 1, in one embodiment of the present disclosure, the development platform 12 collects a user's one or more industry categories, one or more market sizes, one or more functional and non-functional requirements using a dynamic programming algorithm 13, and recommends an application template 16 within the application template library 15 of the development platform 12 that best meets the user's requirements according to the association rules 14.

A dynamic programming algorithm, which is a set of dynamic programming logic instructions, is similar to a divide and conquer algorithm. The central idea of a divide and conquer algorithm is using a solution to a problem to depend on the sub-problems and is often used to determine the best solution to the problem. A divide and conquer algorithm usually works in a top-down manner. The difference between a dynamic programming algorithm and a divide and conquer algorithm is that a dynamic programming algorithm further uses a memorization mechanism, wherein the solutions to the sub-problems are stored to prevent duplicate computations. Therefore, in the situation where some of the sub-problems overlap, using a dynamic programming algorithm can prevent duplicate computation and retain the advantages of recursion.

Association rules are common issues in data mining. Association rules are used to identify relationships between or among valuable data items from large amounts of data. The purpose of using association rules is to reduce potentially large disorganized data to a small amount of static data which is easy to understand. Association rules normally do not consider the order of items, but only consider the combinations of items.

In an embodiment of the present disclosure, the development platform has one or more application template libraries. A plurality of application templates in the one or more application template libraries can come from applications previously developed by users using the development platform. For example, when a user has developed a specific application, the development platform will automatically include the specific application in the one or more application template libraries as a new application template. When the same or a different user develops an application whose industry category, market size, functional and non-functional requirements are similar to those of the specific application, the development platform can recommend the specific application template, which, according to association rules, best matches the user's requirements among the templates in the one or more application template libraries of the development platform; this can increase the efficiency of application development.

In an embodiment of the present disclosure, an electronic application developing method implemented on one or more computing devices, comprising: providing via one or more computing devices an electronic application development platform comprising one or more application template libraries further comprising a plurality of application templates; developing an electronic application using the development platform via the one or more computing devices, wherein no further development of application infrastructures or software coding is required; collecting via the one or more computing devices one or more application requirements, comprising one or more industry category requirements, one or more size of market requirements, one or more functional requirements, and one or more non-functional requirements using a set of dynamic programming logic instructions; determining via the one or more computing devices an optimal application template in the plurality of application templates that best satisfies the application requirements by using one or more association rules; automatically including the electronic application in the one or more application template libraries.

Figure 2:
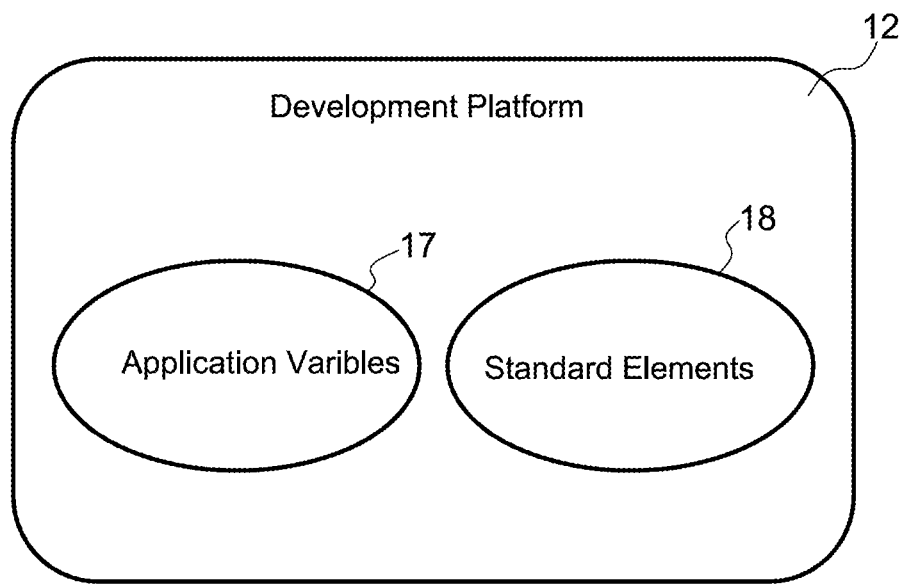
FIG. 2 illustrates the structure of a development platform.

FIG. 2 illustrates a structure of a development platform. As shown in FIG. 2, in one embodiment of the present disclosure, the development platform 12 can be divided into two parts: one or more application variables 17 and one or more standard elements 18. In developing an application using the development platform 12, users only have to define the one or more application variables 17, and based on the one or more standard elements 18, the latest version of the developed electronic application 19 can be deployed without being published.

Figure 3:
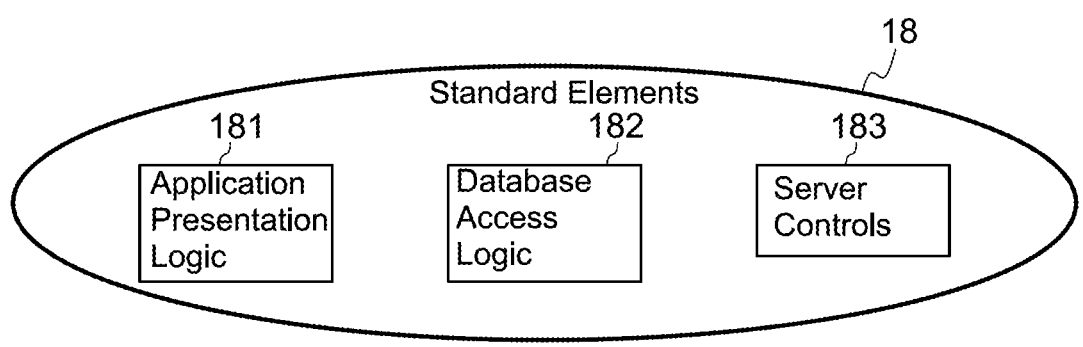
FIG. 3 illustrates the structure of standard elements.

FIG. 3 illustrates a structure of standard elements. Standard elements 18 are fixed parameters and functions that are deployed in the development platform for executing the application. As shown in FIG. 3, in one embodiment of the present disclosure, the standard elements 18 include: one or more application presentation logic 181, one or more database access logic 182 and one or more server controls 183.

Figure 4:
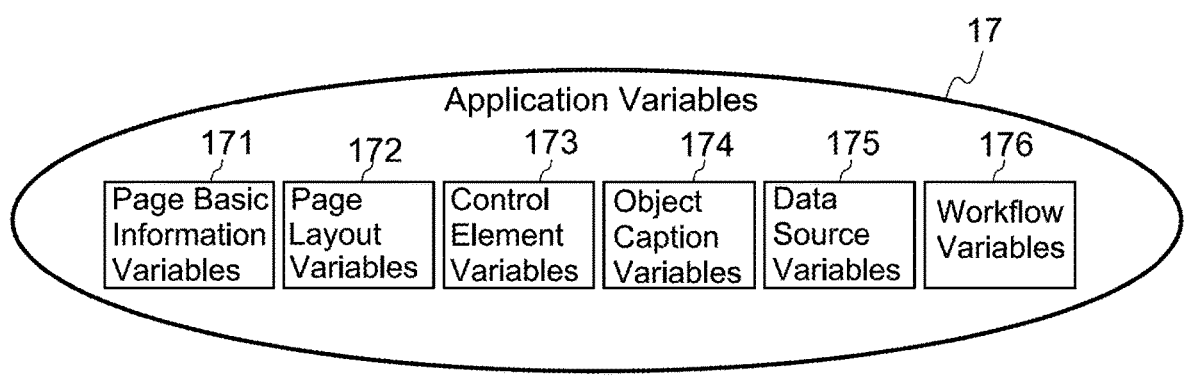
FIG. 4 illustrates the structure of application variables.

FIG. 4 illustrates the structure of application variables. Application variables refer to variables defined with data storage formats and used to develop applications. As shown in FIG. 4, in one of the embodiment of the present disclosure, the application variables include: one or more page basic information variables 171, one or more page layout variables 172, one or more control element variables 173, one or more object caption variables 174, one or more data source variables 175 and one or more workflow variables 176.

Each of the page basic information variables 171 is used to define the basic framework of a corresponding page of the electronic application and further comprises: a title, one or more page footers, one or more style sheets and one or more types.

Each of the page layout variables 172 is used to define one or more objects used on a corresponding page of the electronic application, configurations corresponding to the one or more objects, and types of controls corresponding to the one or more objects, and overwrite the native properties of controls or alternatively authorize controls according to the one or more requirements of the electronic application.

Each of the control element variables 173 is used to define the one or more standardized objects of the electronic application. Control element variables 173 are also used to build standard objects of the application. If any page of the application uses an object identical to a standard object, that element can be defined to have the same control element variables 173 as the standard object. Each of the control element variables 173 comprises one of the follows: the size of the control, the maximum length of the control and the format of the control.

Each of the object caption variables 174 establishes a title of a corresponding object, wherein the title supports multiple written languages. That is, the object is not associated with the title by an absolute relationship but by an identifier so that when the application is switched between different languages, there is no need to modify the titles of the objects one by one. The specific language of the title can be changed in accordance with the specific language of the object by using the identifier. Only object caption variables 174 have to be adjusted such that the titles of the objects will be presented in different languages. For example, when the application is switched from a first language to a second language, the titles of the objects are also switched from a first language to a second language.

Each of the data source variables 175 is used to define one or more data sources related to the business logics of the electronic application. Each of the data source variables 175 further comprises: one or more data tables, one or more data fields, one or more data conditions and one or more data sorts.

Each of the workflow variables 176 is used to define the algorithm logics of the electronic applications in accordance with the business logics of the electronic application. Each of the workflow variables 176 further comprises: the type of a workflow, one or more steps of the workflow, one or more execution conditions and one or more execution functions.

In one embodiment of the present disclosure, all standard elements are entirely encapsulated internally within the development platform. Encapsulation means hiding the standard elements inside the development platform so as to prevent unauthorized parties' direct access thereto. The development platform provides a visual interface for users, the visual interface is capable of performing the following steps to develop the entire application: selecting an application template from the plurality of application templates, designing a business process and a workflow, building a data base, and designing layouts of pages. Such an interface uses cloud technology and does not require the purchase, expansion or maintenance of hardware, or the installation of an operating system, a database server, or an application server to build the electronic application. The visual development interface can support a debugging mode, which provides the user a quick way to instantly view the logic errors in application parameters on the development platform and directly perform unit testing of the electronic application.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limited.

What is claimed is:

1. An electronic application developing method, implemented on one or more computers, comprising:
   collecting via a cloud computing device or a local computing device electronic application requirements of an electronic application user to find an optimal electronic application template that best satisfied the electronic application user requirement from one or more application template libraries of an electronic application development platform, and
   the electronic application requirements are two or more of the followings: one or more industry category requirements, one or more size of market requirements, one or more functional requirements and one or more nonfunctional requirements, wherein collecting the electronic application requirements is based on dynamic programming algorithm and includes dynamically collecting a next requirement of the electronic application requirements according to a former requirement of the electronic application requirements that the electronic application user chose in order to describe characteristics of the electronic application user requirements more precisely,
   wherein no further development of electronic application infrastructures or software coding is required, only the electronic application development platform on the cloud computing device or the local computing device is required to modify the optimal electronic application template for developing an electronic application that meets the electronic application user requirement, and
   wherein the electronic application development platform automatically includes the electronic application in the one or more application template libraries.

2. The method of claim 1, further comprising:
   determining via the cloud computing device or the local computing device with association rules to find an electronic application template in the one or more electronic application template libraries that best relates with the characteristics and using the electronic application template as the optimal electronic application template to be recommended to a platform user.

3. The method of claim 1, wherein the electronic application development platform further comprises:
   a first portion comprising one or more standard elements; and
   a second portion comprising one or more electronic application variables.

4. The method of claim 1, further comprising
   deploying the developed electronic application without publishing.

5. The method of claim 3, wherein the one or more standard elements further comprise: one or more electronic application presentation logics, one or more database access logics, and one or more server controls.

6. The method of claim 3, wherein each of the one or more electronic application variables is defined by a data storage format, and the one or more electronic application variables further comprises: one or more page basic information variables, one or more page layout variables, one or more control element variables, one or more object caption variables, one or more data source variables and one or more workflow variables.

7. The method of claim 6, wherein each of the one or more page basic information variables defines the basic framework of a corresponding page of the electronic application and further comprises: a title, one or more page footers, one or more style sheets and one or more types.

8. The method of claim 6, wherein each of the one or more page layout variables defines one or more objects used on a corresponding page of the electronic application, configurations corresponding to the one or more objects, and types of controls corresponding to the one or more objects, and overwrite native properties of controls or alternatively authorizes controls according to the one or more requirements of the electronic application.

9. The method of claim 6, wherein each of the one or more control element variables defines one or more standard objects of the electronic application and further comprising one of the following: a size of control, a maximum length of control and a format of control.

10. The method of claim 6, wherein each of the one or more object caption variables establishes a title of a corresponding object, wherein the title supports multiple written languages.

11. The method of claim 10, wherein the title is associated with the object by an identifier, wherein the specific language of the title can be changed in accordance with the specific language of the object by using the identifier.

12. The method of claim 6, wherein each of the one or more data source variables defines one or more data sources related to the business logics of the electronic application and further comprises: one or more data tables, one or more data fields, one or more data conditions and one or more data sorts.

13. The method of claim 6, wherein each of the one or more workflow variables defines the algorithm logics of the electronic application in accordance with the business logics of the electronic application and further comprises: a type of workflow, one or more steps of workflow, one or more execution conditions and one or more execution functions.

14. The method of claim 5, further comprising encapsulating all of the standard elements internally within the development platform.

15. The method of claim 14, further comprising providing a user visual interface without the need to install an operating system, a database server or an electronic application server to build the electronic application.

16. The method of claim 15, wherein the user visual interface is capable of performing the following steps:
selecting an electronic application template from the plurality of electronic application templates;
designing a business process;
designing a workflow;
building a database; and
designing layouts of pages.

17. The method of claim 16, wherein the user visual interface further supports a debugging mode, which provides instant viewing of logic errors of electronic application parameters on the development platform, and direct performance of unit testing of the electronic application.

18. A non-transitory computer-readable storage medium for storing instructions performing any one of methods of claim 1.

19. An electronic application developing system, comprising:
the non-transitory computer-readable storage medium of claim 18; and
one or more processors and the related cloud computing device or the related local computing device configured to perform instructions stored on the non-transitory computer-readable storage medium.

\* \* \* \* \*